July 9, 1968 J. HORWITZ 3,392,348

OSCILLATOR FREQUENCY CONTROL

Filed April 19, 1967

INVENTOR.
JOSHUA HORWITZ
BY Robert J. Schiller
ATTORNEY 3,392,348

OSCILLATOR FREQUENCY CONTROL

Joshua Horwitz, Waltham, Mass., assignor to Gordon Engineering Company, Waltham, Mass., a limited Massachusetts partnership Filed Apr. 19, 1967, Ser. No. 631,926
10 Claims. (Cl. 331—47)

ABSTRACT OF THE DISCLOSURE

A circuit in which the variable reactance of a sensor governs the output frequency of a low power oscillator, each half-cycle of a given polarity controlling the set terminal of a flip-flop so as to provide a signal. The latter serves to close a switch which connects the timing capacitor of a high power astable blocking oscillator through a path to ground so as to cause the oscillator to operate and also applies a current pulse from the capacitor to the reset terminal of the flip-flop, thus opening the switch and terminating operation of the blocking oscillator when only one pulse has been generated by the latter.

Figure 1:
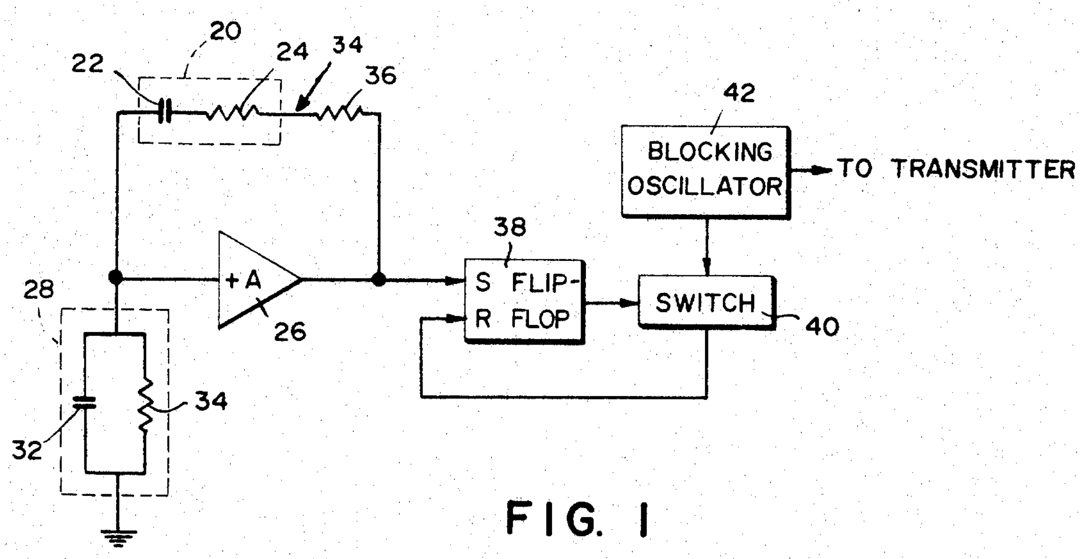

This invention relates to electronic circuitry and more particularly to an electrical circuit for converting a parameter of an analog sensor into digital signals for telemetry.

Telemetry involves both translation of pertinent data into coded form and the transmission of the coded data over a distance. It is commonly used for a number of purposes, an important one of which is radiosonde telemetry. A radiosonde is usually an expendable airborne instrument, carried for example by balloon, for determining and transmitting to a ground station meteorological data such as humidity, temperature, pressure and the like.

A number of the more common radiosondes, such as the standard AN/AMQ–9, provide signal generation for their transmitters by blocking oscillators, well known in the art, which operate in an astable mode to provide pulses according to an RC time constant.

The meteorological parameter sought is usually determined by a sensor device which is an element, the resistance of which is variable according to a parameter such as a temperature. Typically, the value of the variable resistance is converted to data by inserting the element in a path between the capacitor of the oscillator and ground, thereby current modulating the output frequency of the oscillator. However, this approach presupposes that the element can withstand the fairly large voltage (e.g. 40 volts) discharge from the capacitor and also that the value of the impedance of the element changes sufficiently to vary substantially the frequency of the oscillator. A number of sensors are known that cannot meet either or both of these requirements, hence they cannot be connected in the same manner as other sensors as input devices for a single telemetry oscillator.

A typical one of these latter sensors is an aluminum oxide hygrometer such as is described in "Aluminum Oxide Hygrometer: Laboratory Performance and Flight Results," D. Chlek, J. App. Meteorology, vol. 5,No. 6, pp. 878–886. This hygrometer not only is quite electrically complex in that its impedance changes non-linearly with respect to humidity, but it cannot withstand voltages much larger than about 0.5 volt without breakdown.

It is, therefore, a principal object of the present invention to provide a circuit for controlling the output frequency of a relatively high power oscillator in accordance with changes in the complex impedance of a sensor that cannot normally withstand the voltage levels found across the frequency determining elements of the oscillator during operation of the latter.

Another important object of the present invention is to provide an improved circuit including a relatively low power oscillator, including such a sensor complex impedance as a frequency determining element thereof, and means for controlling the output of the relatively high power oscillator in accordance with the frequency of the low power oscillator.

Yet another object of the invention is to provide a simple inexpensive circuit for controlling the output frequency of a high power blocking oscillator in accordance with a variable parameter of a humidity sensor.

These and other objects of the present invention are generally achieved by providing a first oscillator wherein the sensor is a frequency determining element that is not subject to voltages in excess of its breakdown voltage. Means are also provided for controlling, as by locking, the frequency of the high powered oscillator to the output frequency of the first oscillator.

Specifically, a preferred embodiment of the device comprises relatively low power, a first oscillator including a non-inverting, fixed gain amplifier having a positive feedback loop between its output and input and a fixed reactive standard. The latter and the sensor complex impedance are connected, one in the feedback loop and the other between the amplifier input and a fixed reference voltage, typically ground so that the voltage applied across the sensor does not exceed its breakdown voltage. The output of the first oscillator is in turn coupled to a bistable multivibrator so that the latter can be triggered or set by the oscillatory wave-train. Also included is switch means controlled by the set output of the multivibrator for triggering the blocking oscillator into operation by connecting its timing reactance to a current source. The switch means is so connected that when the blocking oscillator has completed at least one cycle, a current is applied by the timing reactance through the switch means to reset the multivibrator, serving to lock the frequency of the blocking oscillator to the output frequency of the first oscillator.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Figure 2:
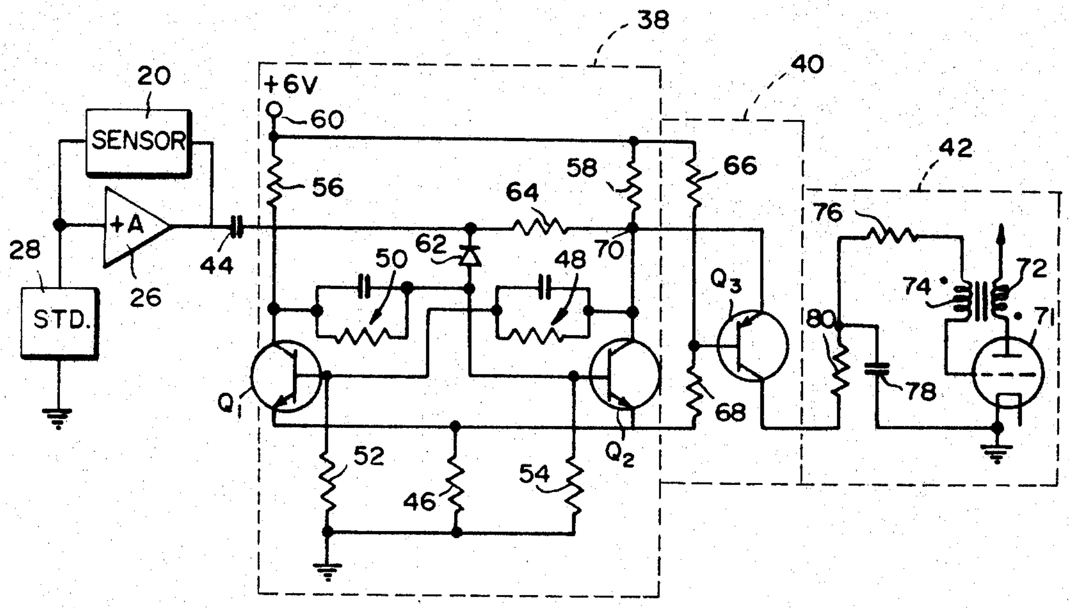

For a fuller understanding of the nature and objects of the present invention, reference should be had to the following detailed description taken in connection with the accompanying drawings wherein:

FIG. 1 is a block diagram showing the arrangement of elements of the present invention; and FIG. 2 is a schematic circuit diagram of the elements of the invention shown in FIG. 1.

Referring now to FIG. 1 of the drawing, there will be seen sensor 20, typically shown as an equivalent circuit comprising series capacitor 22 and resistor 24. There are also included a non-inverting amplifier 26, and standard impedance 28 typically comprising parallel capacitor 32 and resistor 34. Either sensor 20 or impedance 28 is disposed in circuit in feedback loop 34 between the output and input terminals of amplifier 26, the other being connected between the amplifier input terminal and system ground. In either event, the amplifier parameters should be such that the voltages applied across sensor 20 should not exceed the breakdown voltage of the sensor. Because amplifier 26 is non-inverting, feedback loop 34 is positive and the combination constitutes an oscillator. Means such as resistor 36 are selected for adjusting full scale frequency of the oscillator. In the form shown, sensor 20 is in the feedback loop with resistor 36 in series therewith.

Now, assuming that the respective values of capacitor 22, resistor 24, resistor 36, capacitor 32 and resistor 34 are $C_s$, $R_s$, $R_r$, $C_{IN}$, and $R_{IN}$, and that amplifier 26 exhibits no phase shift, then the amplifier will tend to oscillate at a frequency such that $Z/Z_2$ is a real constant and $Z_1$ and $Z_2$ being defined as follows:

$$Z_1 = R_R + R_S + \frac{1}{jwC_S} \quad (1)$$

and $$\frac{1}{Z_2} = Y_Z + jwc_{in} + \frac{1}{R_{IN}} \quad (2)$$

From these equations it can be shown that if the range resistor 36 is not in the circuit, the oscilaltor frequency will vary as the square root of $1/C_sR_s$. Resistor 36 of some value will, however, determine the upper limit of the frequency range. The expected frequency of the oscillator will be determined as follows:

$$f = \tfrac{1}{2}\pi\sqrt{R_{IN}C_{IN}C_S(R_R+R_S)}$$

Thus, for a desired $f$ and for an average value of $C_s$ at $f$, $R_{IN}$ and $C_{IN}$ can be selected accordingly.

Amplifier 26, because of the voltage limitations can be expected to provide relatively low level signals. These latter can be used to control a high power oscillator in the following manner.

The output terminal of amplifier 26 is coupled to a "set" input terminal of a bistable multivibrator of flip-flop 38 so that each half-cycle (such as a positive half-cycle) of the signal from amplifier 26 can trigger flip-flop 38 to produce an output signal. The latter signal is applied through an appropriate connection to the control terminal of switch 40. The latter is disposed for connecting the "reset" terminal of flip-flop 38 to blocking oscillator 42. The latter is typically an astable circuit of the usual type wherein, however, the timing reactance is in the circuit only when switch 40 is closed.

A more detailed description of flip-flop 38, switch 40, and oscillator 42, and their cooperative operation is based on the partial circuit schematic shown in FIG. 2 in which the previously described combination of sensor 20, standard reactance 28 and amplifier form a variable frequency oscillator coupled through capacitor 44 to the set input of flip-flop 38. The latter typically comprises a pair of regeneratively cross-coupled amplifiers such as npn transistors $Q_1$ and $Q_2$. The latter have their emitters directly connected to one another and through resistor 46 to ground, the base of transistor $Q_1$ being connected through RC tank circuit 48 to the collector of transistor $Q_2$. The base of the latter being similarly connected through RC tank circuit 50 to the collector of transistor $Q_1$. The bases of transistors $Q_1$ and $Q_2$ are respectively also connected to ground through resistors 52 and 54. The emitters of transistors $Q_1$ and $Q_2$ are respectively connected through resistors 56 and 58 to a source of biasing potential, for example +6 volts at terminal 60.

Capacitor 44 is connected to the cathode of diode 62, the anode of the latter in turn being connected to the base of transistor $Q_2$. The diode cathode is further connected through resistor 64 to the collector of transistor $Q_2$.

Switch 40 typically comprises pnp transistor $Q_3$ with its control terminal, such as its base tapped into a voltage divider comprised of series resistors 66 and 68 connected between terminal 60 and the coupled emitters of the transistors. The emitter of transistor $Q_3$ is connected to the collector of transistor $Q_2$, i.e. junction 70 of resistors 64 and 58. The collector of transistor $Q_3$ is connected to blocking oscillator 42 so as to provide (when transistor $Q_3$) is conducting, a current discharge path for the timing capacitor of blocking oscillator 42.

The latter being well known in the art, is shown only in partial schematic as a typical inductively plate-grid coupled device normally operative in a free running mode. Oscillator 42 basically includes a triode 71 having its plate connected to a primary winding 72 and its grid connected in series through secondary winding 74, grid resistor 76 and timing capacitor 78 to ground. The junction of resistor 76 and capacitor 78 is connected through resistor 80 to the collector of transistor $Q_3$. Characteristically, this blocking oscillator will not oscillate unless the timing capacitor can discharge along some path other than to the tube grid because the capacitor change will hold the tube above cut-off. As is well known, this is also the case with other astable oscillators that depend on sequential charge and discharge of an RC circuit to establish their output frequencies.

In operation, the wave-form generated by amplifier 26 at a frequency according to the value of the complex impedance of sensor 20, is applied through capacitor 44 to diode 62. The latter is poled so that only the negative peaks produced by capacitor 44 during the positive half-cycles are then applied to the base of transistor $Q_2$. Assuming transistor $Q_2$ to be driven "off" by such a half cycle and transistor $Q_1$ to be therefore "on," the collector of the former will then rise toward the +6 volt level at terminal 60 because the transistor is not conducting and resistor 58 is much smaller in value than resistor 64. The emitter of transistor $Q_3$ then also rises toward this potential. Preferably resistors 66 and 68 are about equal in value and resistor 46 somewhat smaller. Hence, the voltage divider action of these resistors hold the base of transistor $Q_3$ at a lessor voltage than the potential at terminal 60, for example, +4 volts. When the voltage at junction 70 then exceeds the voltage on the base of transistor $Q_3$, the latter becomes biased into conduction, any charge on capacitor 78 then is switched as a current pulse through the collector-emitter circuit of transistor $Q_3$ and applied both through RC tank 48 to the base of transistor $Q_1$ forcing the latter out of conduction and toward ground through resistor 52, causing oscillator 42 to go into oscillation.

As transistor $Q_1$ turns "off," its collector potential moves toward the voltage at terminal 60, this tends to drive transistor $Q_2$ into conduction, and regeneration forces rapid switching of transistor $Q_1$ to full "off" and transistor $Q_2$ to full "on," as well known in the art. As transistor $Q_2$ goes "on," its resulting collector-emitter current causes the potential at junction 70 to move toward ground sufficiently to remove the forward bias from transistor $Q_3$, switching the latter "off." Transistor $Q_2$ will continue to hold transistor $Q_3$ "off" until the next positive half-cycle again drives transistor $Q_2$ out of conduction.

Preferably, the circuit parameters are selected so that the time required for a current pulse from capacitor 78 to turn transistor $Q_1$ "off" so that transistor $Q_2$ then turns "on," and the switch of transistor $Q_3$ thus opens, is sufficient for oscillator 42 to generate only one pulse. Thus, for each positive half-cycle from amplifier 26, oscillator 42 provides a corresponding pulse. The latter is in this manner frequency locked to the amplifier, notwithstanding the natural frequency at which the blocking oscillator would oscillate normally.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. A circuit for controlling the output frequency of a relatively high power blocking oscillator in accordance with changes in the complex impedance of a variable sensor normally incapable of withstanding the voltage levels across the frequency determining elements of said oscillator, said circuit comprising, in combination;

oscillator means including said sensor as a frequency determining element thereof for generating an oscillatory signal at a frequency dependent upon the value of said impedance without applying a voltage to said sensor in excess of the breakdown voltage for said sensor; and means connecting said oscillator means to said blocking oscillator for controlling the frequency of said high power blocking oscillator in accordance with the frequency of said oscillator means.

2. A circuit as defined in claim 1 wherein said sensor is an aluminum oxide humidity sensor.

3. A circuit as defined in claim 1 wherein said oscillator means is an oscillator having an RC timing circuit for controlling its output frequency, said RC timing circuit including a standard complex impedance and the variable impedance of said sensor disposed so that said oscillator means tends to oscillate at a frequency such that the ratio of the impedances of said sensor and said standard impedance substantially remains a real constant.

4. A circuit as defined in claim 3 wherein said oscillator means includes a non-inverting amplifier having input and output terminals respectively connected through a positive feedback loop, one of the sensor and the standard impedance being connected between system ground and the input terminal of said oscillator means, the other being connected in said positive feedback loop.

5. A circuit as defined in claim 4 wherein said sensor is connected in said feedback loop with a scaling resistance.

6. A circuit as defined in claim 1 wherein said high power oscillator is an astable oscillator having a timing reactance, and wherein said means for controlling comprises;

switch means for selectively providing a current path for discharging said timing reactance so as to trigger said astable oscillator into operation; and means for closing said switch means responsively to said oscillator signal and for opening said switch means responsively to the discharge of said variable reactance along said path.

7. A circuit as defined in claim 6 including means for timing the opening and closing of said switch means so that said switch means is opened for terminating operation of said astable oscillator before the latter can produce more than one output pulse.

8. A circuit as defined in claim 6 wherein said means for opening and closing said switch means comprises a multivibrator having an output terminal and set and reset input terminals one of the latter being so coupled to said oscillator means that each alternate half-cycle of said oscillatory signal triggers said multivibrator to produce a corresponding pulse, the other of said input terminals being connected to said current path; and wherein said switch means includes a control terminal connected to said output terminal of said multivibrator.

9. A circuit as defined in claim 8 wherein said oscillator means is coupled to said multivibrator through rectifying means.

10. A circuit as defined in claim 8 wherein said multivibrator comprises a pair of transistors having directly coupled emitters, regeneratively cross-coupled collectors and bases, the base of a first of said transistors being connected through diode means to said oscillator means; and wherein said switch means comprises a transistor having an emitter connected to the collector of said first transistor, a base connected to a voltage divider and a collector connected to said timing reactance.

References Cited

UNITED STATES PATENTS

| | | | |
|---|---|---|---|
| 2,558,343 | 6/1951 | Cosby | 325—113 |
| 2,591,600 | 4/1952 | Pear | 331—65 |
| 3,257,607 | 6/1966 | Pintell | 331—141 |

JOHN KOMINSKI, *Primary Examiner.*